Aug. 20, 1935. H. SINCLAIR 2,011,734
VARIABLE SPEED GEARING PARTICULARLY FOR USE WITH HYDRAULIC COUPLINGS
Filed June 13, 1932 3 Sheets-Sheet 1
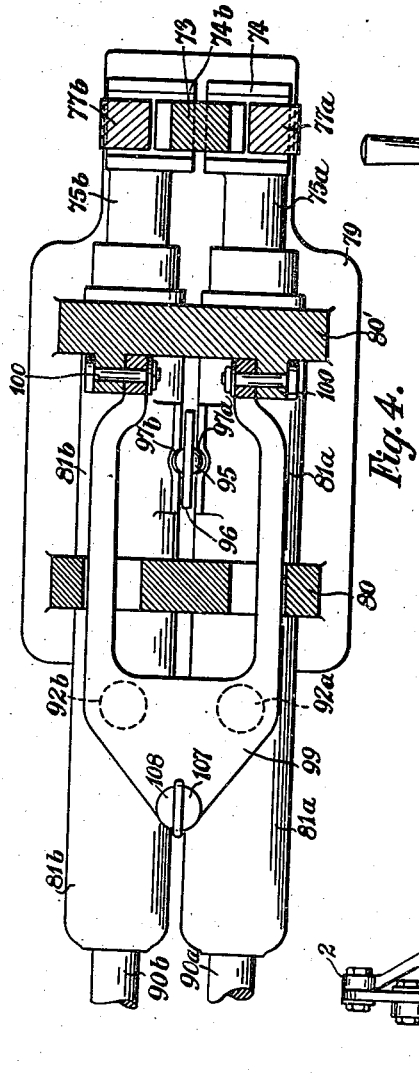
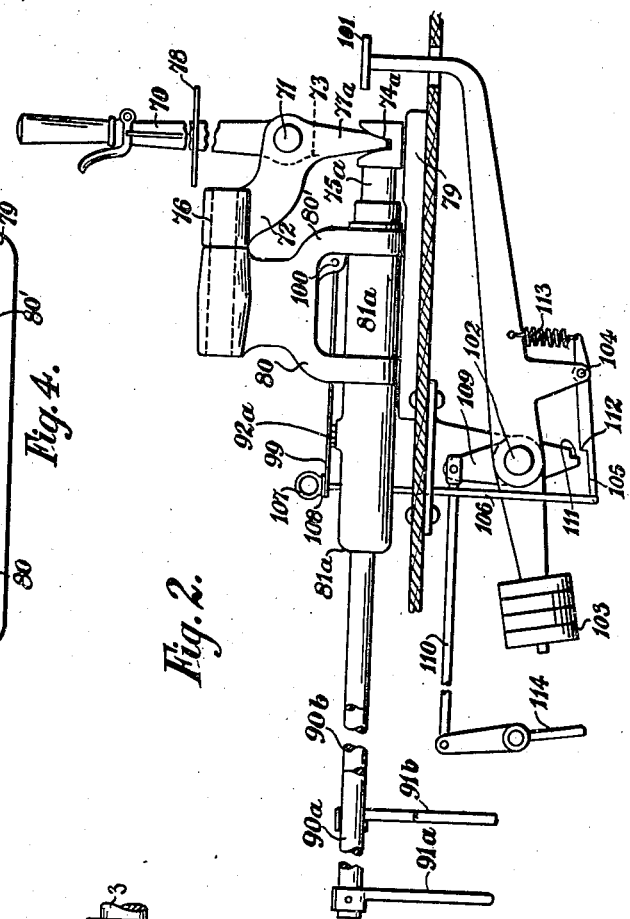
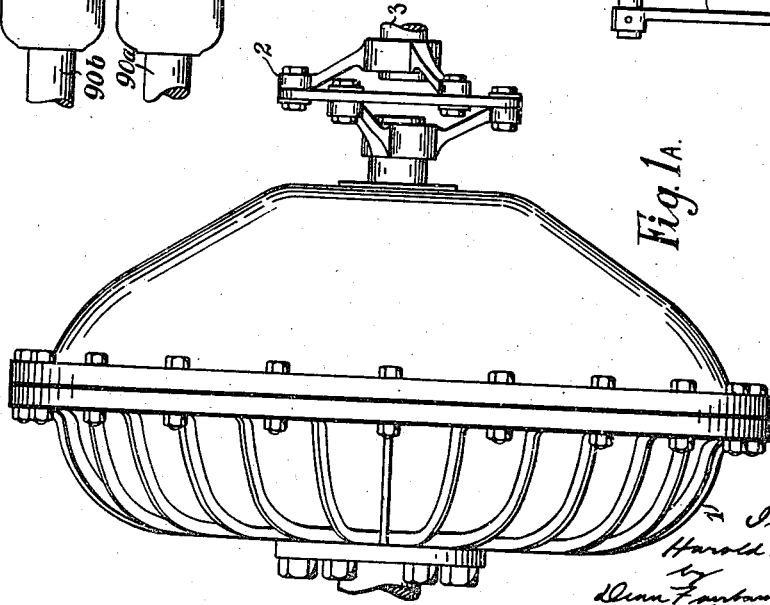

Aug. 20, 1935.                    H. SINCLAIR                          2,011,734
        VARIABLE SPEED GEARING PARTICULARLY FOR USE WITH HYDRAULIC COUPLINGS
                            Filed June 13, 1932        3 Sheets-Sheet 2
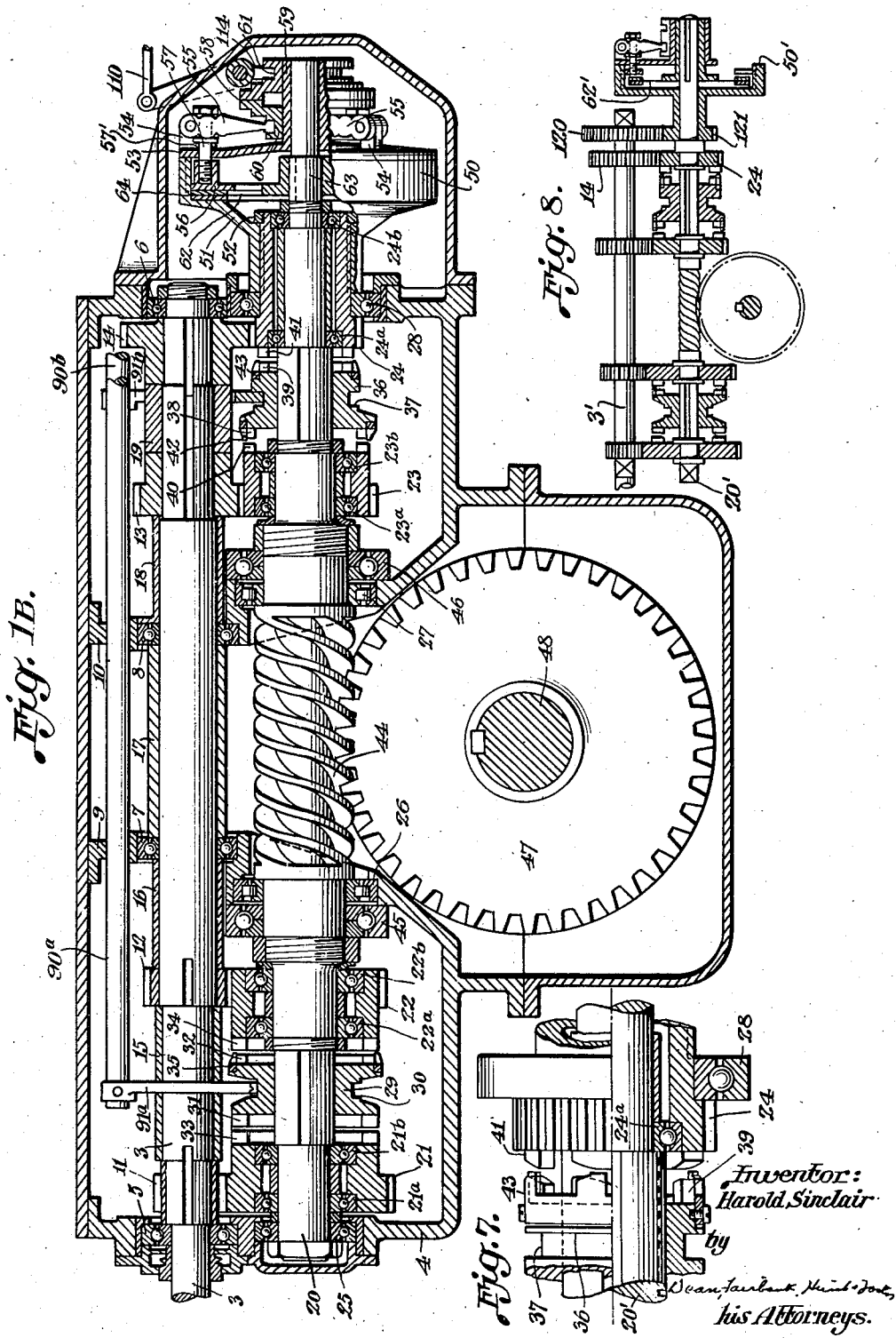
Inventor:
Harold Sinclair
by
his Attorneys.

Aug. 20, 1935.   H. SINCLAIR   2,011,734
VARIABLE SPEED GEARING PARTICULARLY FOR USE WITH HYDRAULIC COUPLINGS
Filed June 13, 1932   3 Sheets-Sheet 3
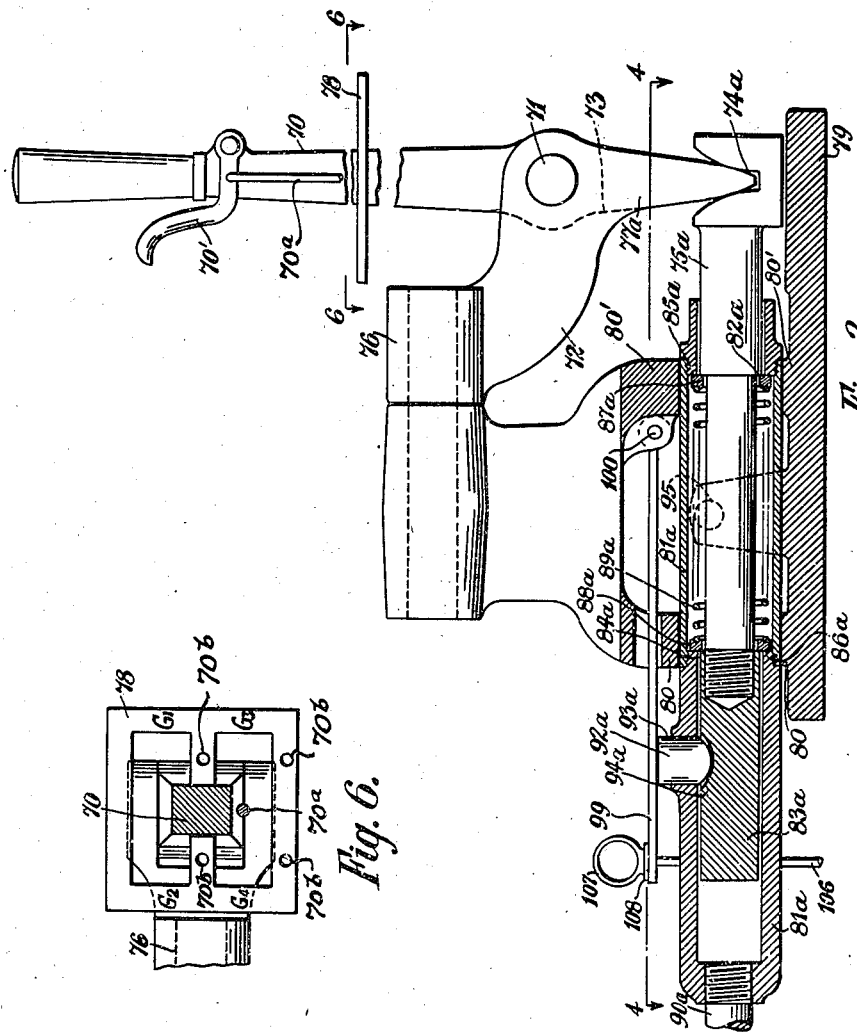
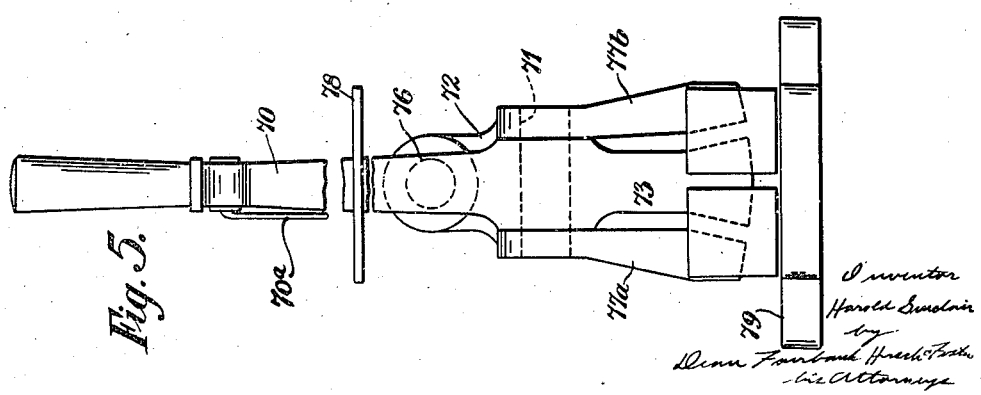

Patented Aug. 20, 1935

2,011,734

UNITED STATES PATENT OFFICE 2,011,734

VARIABLE SPEED GEARING PARTICULARLY FOR USE WITH HYDRAULIC COUPLINGS

Harold Sinclair, Surbiton Hill, England

Application June 13, 1932, Serial No. 616,805
In Great Britain June 15, 1931

17 Claims. (Cl. 74—330)

The present invention relates to improvements in variable speed gearing particularly, but not exclusively, for use with hydraulic couplings.

With certain known kinds of variable-speed gear mechanisms (for example, the ordinary automobile change-speed gear box) it is not possible to maintain the transmission of driving torque to the driven shaft of the mechanism during the operation of gear changing, with the result that the transmission of power is interrupted intermittently. In many applications of such gear mechanism, for example with internal-combustion-engined-locomotives, rail-cars, cranes, tractors, excavators and the like, this feature is disadvantageous.

A further disadvantage of certain of such change-speed gear mechanisms is due to the fact that considerable skill is required to effect a change of gear ratio, particularly when the gear mechanism is running at high speeds. If an attempt is made to change gear without suitably accelerating or retarding (as the case may be) the driving shaft of the mechanism, parts of the mechanism may be overstressed, and undue wear and tear will result.

In order to retard the spinning masses during gear changing it is frequently necessary to provide a clutch stop. With such arrangements the rotational energy is wasted in wearing out the clutch stop.

It has been proposed to overcome these disadvantages, in the case of Diesel-engined locomotives, by the arrangement described in British Patent Specification No. 292,549, and the modifications of this arrangement described in British Patent Specifications Nos. 297,793 and 309,134.

One of the objects of the present invention is to provide, in conjunction with multi-ratio change-speed gear mechanism, improved means, which are relatively cheap and simple, for facilitating the operations of gear changing, and which are particularly adapted for use when a hydraulic coupling forms part of the transmission system. A further object of the invention is to provide in variable speed gearing an improved mechanism which takes the place of the usual clutch stop brake and which, while serving the purpose of an ordinary clutch stop, usefully employs a substantial part of the energy which has previously been wasted by the usual clutch stop and which at the same time acts as a brake.

According to the present invention, in a power-transmission system comprising a multi-ratio gear mechanism there is provided auxiliary coupling means having two elements adapted to be coupled to and uncoupled from each other, said coupling means being in parallel with said mechanism and adapted to transmit substantial torque, and the said two elements being in mechanical connection with the driving and the driven shafts of the gear mechanism respectively during all the operations of changing from a lower to a higher gear.

The auxiliary coupling means are preferably so designed as to be capable of transmitting from the driving shaft to the driven shaft of the gearing at least the maximum power that can be applied by the driving engine at any engine speed. Consequently the auxiliary coupling means are preferably of such a capacity as to be capable of transmitting a torque corresponding to the normal maximum engine torque, that is to say, a torque equal to the normal maximum engine torque multiplied by the ratio of the gearing, if any, by which the driving part of the auxiliary coupling is connected to the driving shaft of the variable speed gearing. In certain applications, however, such as where it is desired to provide as compact a construction as possible, the auxiliary coupling means may have a lower capacity, sufficient to prevent deceleration of the normal load during the period of changing from any lower to any higher speed gear. For example, where the invention is applied to a mechanically propelled vehicle, the torque capacity of the auxiliary coupling means may correspond to not less than one-half of the full-load torque of the driving motor.

According to the present invention in another aspect, in a power-transmission system comprising a multi-ratio gear mechanism there is provided auxiliary coupling means having two elements adapted to be coupled to and uncoupled from each other, said coupling means being in parallel with said mechanism and adapted to permit relative motion while transmitting substantial torque, and the said two elements being mechanically connected in invariable ratio with the driving and driven shafts of said mechanism respectively.

The auxiliary coupling means are preferably adapted to couple the driving shaft to the driven shaft of the gear mechanism in a ratio equal, or nearly equal to the ratio of the highest speed gear of the multi-ratio gear mechanism, so that when the gear is changed from any ratio to any higher-speed ratio, the coupling means permit driving torque to be transmitted to the driven shaft of the gear mechanism during the operation of gear changing, and at the same time serve to bring the relative speeds of rotation of the driving and driven shafts into the same ratio as that of the gear required to be engaged.

It has previously been proposed to provide, between the driving and the driven shafts of a motor-car gear-box, auxiliary transmission mechanisms adapted to synchronize the speeds of one or more of the spur wheels of the gear-box preparatory to engagement of a gear. Such mechanisms have been intended to be put into engagement only when the transmission of the driving torque has been interrupted by a main friction clutch; they have therefore been designed to transmit from the driven shaft of the gear-box merely sufficient energy to overcome the inertia of parts of the transmission system spinning freely with the driving shaft of the gear-box, and they have not been intended to withstand application of a substantial torque. Mechanisms of this kind are unsuitable for use in a power-transmission system wherein a hydraulic coupling, without other disconnecting means, is employed to couple the engine to the multi-ratio gear mechanism, since the torque transmitted by the hydraulic coupling during gear-changing operations is sufficient to destroy such auxiliary synchronizing mechanisms.

The invention will be described by way of example with reference to the accompanying drawings, in which Figs. 1a and 1b are part-sectional side elevations of a portion of the power transmission system of an oil-engine-driven locomotive, Fig. 2 is a diagrammatic side elevation of controlling means for the mechanism shown in Fig. 1, Fig. 3 is a diagrammatic part sectional side elevation of parts of the controlling means to an enlarged scale, Fig. 4 is a sectional plan on the line 4—4 of Fig. 3, Fig. 5 is an end elevation of a part shown in Fig. 3, Fig. 6 is a sectional plan of a detail on the line 6—6 of Fig. 3, Fig. 7 is a part-sectional elevation of a detail of Fig. 1 to an enlarged scale, Fig. 8 is a diagrammatic part-sectional elevation of a modification of the arrangement shown in Fig. 1.

Referring to Fig. 1 the crank-shaft of the driving engine (not shown) is connected to the driving element of a hydraulic coupling 1, which may be of the kind described in my United States Patent No. 1,963,720, the driven element of the coupling 1 being connected through a flexible coupling 2 of known type to the driving shaft 3 of a four-speed constant-mesh helical-spur-wheel gear mechanism contained in a gear-box casing 4. The driving shaft 3 is journalled in ball bearings 5 and 6 housed in the ends of the casing 4, and in intermediate ball bearings 7 and 8 housed in transverse members 9 and 10 respectively, formed integrally with the casing 4. First, second, third, and fourth gear driving pinions 11, 12, 13, 14 respectively, are secured by splines to the driving shaft 3 being spaced from one another by sleeves 15, 16, 17, 18 and 19.

A worm shaft 20, which is disposed below and parallel to the driving shaft 3, carries the first, second, third, and fourth gear driven wheels 21, 22, 23 and 24 respectively which are constantly in mesh with their respective driving wheels and which are journalled on the worm shaft 20 by ball bearings 21a, 21b; 22a, 22b; 23a, 23b; and 24a, 24b. The worm shaft 20 is mounted in a ball bearing 25 housed in the left-hand end of the casing 4, roller bearings 26 and 27 housed in the transverse members 9 and 10 respectively, and a ball bearing 28 housed in the right-hand end of the casing 4 and carried by the gear wheel 24. The first and second driven gear wheels 21 and 22 can be clutched alternatively to the shaft 20 by means of jaw clutches. A clutch member 29 is mounted on splines formed on the shaft 20 in such a manner that it is slidable axially of this shaft but is constrained to rotate positively therewith. The slidable clutch member 29, which is provided with the usual groove 30 for a slidable actuating fork 91a, is formed with teeth 31 and 32 adapted respectively to mesh with teeth 33 and 34 formed on the wheels 21 and 22 respectively. The teeth 32 are shrouded by a balking ring 35 of known type suitably retained on the clutch member 29 and furnished with stepped projections extending towards the teeth 34 and adapted to prevent meshing of the teeth 32 and 34 when the gear wheel 22 is rotating substantially faster, or substantially slower, than the clutch member 29. The third and fourth driven gear wheels 23 and 24 can be similarly clutched alternatively to the shaft 20 by means of the slidable clutch member 36, which is provided with a groove 37 for a slidable actuating fork 91b and teeth 38 and 39 adapted to mesh respectively with teeth 40 and 41 formed on the wheels 23 and 24 respectively, the teeth 38 being shrouded by a balking ring 42 similar to the balking ring 35. In order to prevent meshing of the teeth 39 and 41 when the fourth driven wheel 24 is rotating substantially faster than the slidable clutch member 36, the ends of the teeth 39 and 41 are bevelled in such a way that their leading sides are shorter than their trailing sides (the words "leading" and "trailing" referring to the direction of relative rotation of the parts 24 and 36 under these circumstances). The teeth 39 are shrouded by a balking ring 43 provided with projections stepped on one edge only, so that the ring 43 serves to prevent meshing of the teeth 39 and 41 only when the fourth driven wheel 24 is rotating slower than the slidable clutch member 36.

The central part of the shaft 20 has the form of a worm 44, thrust bearings 45 and 46 being provided to transfer axial loads in the worm shaft to the transverse members 9 and 10. The worm 44 meshes with a worm wheel 47 keyed to a shaft 48, which is connected to the driving axles of the locomotive through suitable reversing gearing (not shown).

A coupling, which in the example shown in Fig. 1b has the form of a friction clutch 50 is provided in parallel with the multi-ratio gear mechanism. One element of this clutch, includes a body 51 splined to the fourth driven gear wheel 24 and secured thereto by a nut 52, a cover 53 attached to the body 51 by set-screws (not shown) and provided with three lugs 54 to which a corresponding number of forked levers 55 are pivotally connected, an annular presser plate 56 the periphery of which is furnished with teeth slidably fitted in longitudinal grooves in the interior of the body 51, push rods 57 screwed into sockets formed on the presser plate 56 and adapted to be moved axially by the levers 55, springs 57' urging the push rods 57 away from the clutch body 51, and an actuating sleeve 58 journalled on and slidable axially of a cylindrical boss 59 formed on the cover 53, the sleeve 58 being provided with a groove 60 in which the tail ends of the levers 55 engage and a groove 61 for a pivoted clutch actuating fork 114. The other element of the clutch includes a disk 62 riveted or otherwise secured to a boss 63 splined to the end of the worm shaft 20 in such a way that it is slidable axially of but is constrained to rotate with this shaft. The disk 62 is provided with friction rings at 64 adapted to abut against corresponding faces on the body 51 and presser plate 56.

This transmission mechanism is provided with control means whereby a desired gear may be pre-selected by movement of a gear-selecting lever and the operations of gear-changing may thereafter be caused to take place automatically upon operation of a further control member.

Referring to Figs. 2 to 6, the gear selecting lever 70, which is pivoted at 71 in a bracket 72, is provided with a tongue 73 adapted to engage with grooves 74a and 74b in primary selector rods 75a and 75b. The bracket 72, pivotally mounted on a fixed pin 76, is provided with two selector rod stops 77a and 77b adapted to engage with the grooves 74a and 74b respectively. A conventional form of gear gate 78 providing for four positions $G_1$, $G_2$, $G_3$, $G_4$ of the gear lever 70, corresponding to the first, second, third and fourth gears respectively, is fitted round the gear lever above the level of the pin 76, and so arranged that, by rocking the gear lever 70 with the bracket 72 about the pin 76, the tongue 73 of the gear lever may be engaged with one of the grooves 74a and 74b and disengaged from the other of these grooves, while one of the stops 77a and 77b remains engaged with the groove from which the tongue has been disengaged. The gear lever 70 is provided with latching mechanism comprising a latch 70a adapted to engage in four holes 70b formed in the gate 78 whereby it may be latched in any of the four engaged gear positions. A trigger 70′ serves to release the latch.

The selector-rod mechanism is provided with a cast frame member 79 which is secured in fixed relationship with the gear box casing 4. The base 79 is provided with two upwardly projecting members 80 and 80′ which serve as guides for two selector spring boxes 81a and 81b of known type, and support the pin 76. The left-hand end of the primary selector rod 75a is reduced in diameter so as to form a shoulder 82a (Fig. 3), and to the extremity of the reduced portion is secured a cam bolt 83a, the inner end of which forms a shoulder 84a, the distance between the shoulders 82a and 84a being equal to the distance between corresponding internal shoulders 85a and 86a formed on the selector spring box 81a. Loose collars 87a and 88a are caused normally to abut against the pairs of shoulders 82a, 85a, and 84a, 86a, respectively by the action of a compressed spring 89a. To the left-hand end of the spring box is secured a secondary selector rod 90a to which in turn is suitably coupled the first and second gear actuating fork 91a. The spring box tends to maintain the primary and secondary selector rods in a definite relationship, but allows the primary rod to be displaced relatively to the secondary rod when urged by a force exceeding the restoring force exerted by the spring 89a. A plunger 92a is slidably fitted in a guide 93a formed on the upper part of the spring box 81a, the lower end of the plunger resting on the cam bolt 83a and its upper end abutting against a plate 99 pivoted at 100 to the member 80′. A cam groove 94a is formed in the cam bolt 83a in such a position that the plunger 92a can drop into this groove when the primary and secondary selectors are in normal relationship. The spring box 81b, which is of similar construction to the box 81a, serves to connect the primary selector rod 75b through the secondary selector rod 90b to the third and fourth gear actuating fork 91b, and is provided with a plunger 92b which also abuts against the plate 99. An interlocking ball 95, located by a tongue 96 formed on the frame casting 79, co-operates with notches 97a and 97b formed in the spring boxes 81a and 81b, serving to prevent more than one of these boxes from being displaced from its neutral position at a time.

The control member for engaging the auxiliary clutch 50 has the form of a pedal 101 pivoted about a fixed pin 102 and provided with a counter-weight 103 which urges the pedal towards its raised position. Pivotally connected to the pedal 101 at 104 is a trigger-lever 105 to which in turn is pivotally connected a link 106, the upper portion of which passes freely through a hole in the plate 99 and terminates in a finger ring 107 provided with a shoulder 108 which prevents the ring from dropping through the hole in the plate 99. A two-armed lever 109 is also pivotally mounted on the pin 102, being movable independently of the pedal 101; to the upper arm of this lever is pivoted a clutch actuating rod 110, which in turn is pivoted to the clutch actuating fork 114, and the lower arm is provided with a projection 111 adapted to engage with a detent 112 formed on the trigger 105. A spring 113 urges the trigger 105 in an anti-clockwise direction about the pivot 104.

The method of operating this transmission mechanism is as follows: Assuming that the locomotive is stationary and that the driving engine is running at idling speed, the multi-ratio gear mechanism and the gear lever being in neutral, and that the reversing gearing is set to give the desired direction of travel, the drag in the hydraulic coupling will cause the driving shaft 3 to be rotated by the engine, and rotation will consequently be imparted to the four driven gear wheels 21, 22, 23 and 24 and to the body element of the auxiliary friction clutch 50. The disk element of the clutch 50 will be at rest, since it is positively connected to the stationary driving axles through the worm shaft 20, the worm 44, the worm wheel 47, the shaft 48 and the reversing gearing. If now it is desired to start the locomotive from rest the driver pulls up the finger ring 107, thus engaging the projection 111 with the detent 112, and depresses the pedal 101, whereupon the lever 109 is caused to rotate clockwise with the result that the rod 110 is drawn to the right. The consequent rotation of the clutch fork 114 urges the sleeve 58 to the left (Fig. 1), whereupon the push rods 57 are forced by the levers 55 to move to the left so that the friction rings of the disk 62 are gripped between the presser plate 56 and the body 51. The clutch 50 being thus engaged, the rotation of the primary shaft 3 and of the gear wheels is thereby arrested (owing to the frictional resistance of the locomotive) so that one of the gear selecting clutches, for example, the first gear clutch 31, 33 may be engaged without shock, by moving the gear lever 70 into the first gear notch, $G_1$, the slip in the hydraulic coupling now being 100%. This function of the friction clutch 50 is equivalent, in effect, to that of a powerful clutch stop. As soon as the first gear has been engaged, the friction clutch 50 is dis-engaged by releasing the pedal 101 and the driving engine is accelerated, and with increase of speed the slip in the hydraulic coupling rapidly diminishes to a small value, thus accelerating the locomotive. When it is desired to change to a higher gear, for example, second gear, the engine may be allowed to continue to develop its full or a substantial torque and the gear lever 70 is moved into position G₂ and latched there, thus forcing the primary selector rod 75a to move to the right. Owing, however, to the torque load on the teeth 31, 33, first gear remains engaged, and the spring box 81a is thereby retained in its left-hand position, the spring 89a being further compressed between the shoulders 84a and 85a. This movement of the cam bolt 83a to the right relative to the spring box 81a causes the plunger 92a to rise, since the groove 94a is moved out of register with the guide 93a in the spring box; the head of the plunger consequently raises the plate 99 and thus causes the detent 112 to engage with the projection 111. The driver now depresses the pedal 101 and thus causes the friction clutch 50 to engage sufficiently to transmit the driving torque by way of the gear train 14, 24, from the shaft 3 to the worm shaft 20. Owing to the difference in ratio between the first gear train 11, 21 and the fourth gear train 14, 24, the driving and driven parts of the clutch 50 will be rotating at different speeds when this clutch is engaged, and the clutch will therefore slip but at the same time tend to reduce the speed of the shaft 3 relative to that of the worm shaft 20. Meanwhile, as soon as the driving torque is transferred, by slipping engagement of the clutch 50, from the first gear train 11, 21 to the fourth gear train 14, 24, the load on the teeth 33, 31 will be eliminated, and clutch member 29 will thus be free to be moved towards the right under the influence of the spring 89a. The first gear having thus been disengaged, the driving torque is now transmitted solely by the slipping clutch 50. Since at the moment when the first gear clutch teeth 31, 33 are disengaged the teeth 34 of the second driven wheel 22 are revolving faster than the teeth 32 of the clutch member 29, the teeth 34 engage with the stepped projections of the balking ring 35 and are thus prevented from meshing with the teeth 32, the balking ring now rotating relative to the clutch member 29. As a result of the transmission of driving torque on the fourth gear train, the speed of the driving engine is reduced, as already mentioned, and the rotational speeds of the clutch member 29 and the second driven gear 22 become synchronized. As soon as synchronism is attained, the second driven wheel 22 begins to revolve slower than the clutch member 29, and the teeth 34 slip off the stepped projections of the balking ring 35 and are thus enabled to pass between these projections into mesh with the teeth 32.

The completion of the movement of the secondary selector rod 90a restores the plunger 92a to its normal position; the plate 99 thus falls, allowing the spring 113 to move the trigger 105 out of engagement with the projection 111, so that the clutch actuating fork 114 is disconnected from the pedal 101, and, although the pedal 101 is still depressed, the clutch presser plate 56 no longer compresses the friction disc 62 against the clutch body 51. The friction clutch 50 is thereby automatically released immediately the second gear is engaged, the transmission of driving torque being transferred to the second gear train. The gear change is thus effected without shock, and with only a momentary diminution in the driving torque transmitted and not a complete interruption of the drive. The automatic disengagement of the auxiliary clutch 50 insures that this clutch will be subjected to a minimum of wear. The pedal 101 may be permitted to rise at any convenient time in preparation for the next engagement of the auxiliary clutch.

To change from second to third gear the gear lever 70 is moved transversely through the gate into position G₃ and latched there, so that the primary selector rod 75a is returned to its neutral position and locked there by the stop 77a and the primary selector rod 75b is displaced from neutral to its left-hand position. Owing to the torque load on the second gear dog clutch teeth 32 and 34 the spring box 81a is retained in its right-hand position, the spring 89a being now compressed between the shoulders 82a and 86a. The plunger 92a is thus lifted, so that it raises the plate 99 and engages the detent 112 as before. Owing to the action of the inter-lock ball 95, the spring box 81b is retained in its neutral position, so that the plunger 92b also acts to keep the plate 99 raised. The driver next depresses the pedal 101, which engages the auxiliary clutch 50 and transfers the drive to the top gear train, the clutch 50 transmitting the driving torque while slipping from the shaft 3 to the worm shaft 20. As soon as the second gear clutch teeth 32, 24 are thus relieved of torque load the slidable clutch member 29 now slides to its neutral position under the action of the spring 89a, the plunger 92a returning to its normal position, and the action of the spring 89b causes the interlock ball 95 to move from notch 97b to notch 97a and thereafter moves the secondary selector rod 90b with the slidable clutch member 36 to the left, thus engaging third gear under control of the balking ring 42 as soon as the slipping auxiliary clutch 50 has retarded the shaft 3 sufficiently to effect substantial synchronism of the speeds of the third gear teeth 38, 40. As soon as third gear is engaged, the plunger 92b drops to its normal position, thus disengaging the trigger 105 and effecting automatic release of the auxiliary friction clutch 50.

To change from third to fourth gear, the sequence of operations is again similar to that described with reference to the change from first to second gear, the gear lever being operated to urge the slidable clutch member 36 out of mesh with the third driven gear 23 and into mesh with the fourth driven gear 24. When the friction clutch 50 is engaged and the driving torque is thereby transferred to the fourth gear train 14, 24, the slidable clutch member 36 is released from the third driven wheel 23 and is free to approach the fourth driven wheel 24 which is revolving faster than the slidable clutch member 36 as a result of the slip occurring in the friction clutch 50. Owing to the bevelled shape of the ends of the teeth 39 and 41, the slidable clutch member 36 rides freely over the fourth driven wheel 24 until, as a result of the action of the friction clutch 50, the speeds of the parts 36 and 24 approach synchronism. When substantial synchronism is attained, the balking action of the bevelled tooth ends becomes negligible, and the teeth 39 are able to mesh with the teeth 41, so that the drive is transmitted positively through the fourth gear train 14, 24, the clutch 50 being automatically dis-engaged as previously described.

If for any reason, for example accidental loss of speed of the driving engine during the operation of changing from third to fourth gear, the fourth driven wheel 24 rotates slower than the slidable clutch member 36, the balking ring 43 serves to prevent the teeth 39 from being meshed with the teeth 41 before substantial synchronism is re-established, and thus protects the transmission system against shock.

It will thus be evident that the gear may be changed from any lower to any higher gear, while the locomotive is running, without risk of shock and with at the most only a partial reduction in the tractive effort of the locomotive.

When it is desired to change from fourth gear to third gear or second gear, or from third gear to second gear, while the locomotive is running, the slidable clutch member 36, and also if required the slidable clutch member 29, is urged by the selecting mechanism towards the desired position; the clutch member 36 is however, prevented from sliding owing to the torque load on the teeth of the engaged gear. The power output of the engine is now momentarily interrupted, (for example, by closing and re-opening the fuel control), with the result that the torque on the meshed clutch teeth is released, and the engaged slidable clutch member 36 is free to slide out of mesh. The driving engine now accelerates, owing to the reduction in the load, and as soon as the speeds of the teeth required to be meshed pass the point of synchronism, the balking ring 42 or 35, as the case may be, rotates relative to the slidable clutch member 36 or 29 respectively so as to allow the clutch teeth 40 or 34 of the lower gear driven wheel 23 or 22 to be meshed with the teeth 38 or 32 of the corresponding slidable clutch member. The drive is now taken up by the lower gear without shock, the time required to transfer the driving torque from the higher to the lower gear being no longer than is necessary to allow the driving engine to accelerate to the speed corresponding to the lower gear.

In the example shown in Fig. 1, no balking device is provided in association with the first gear train since this gear is intended to be used only when starting from rest after the gear has been set to neutral and it would never be required to change down from second to first gear while the locomotive was in motion.

The slidable clutch members 29 and 36 may be arranged for engagement or disengagement without the agency of pre-selective mechanism; and other suitable kinds of selecting mechanism may be employed, for example the gear selectors may be actuated through fluid pressure or electric relay mechanism. Further, the gear selecting mechanism may be interconnected in any other suitable manner with the operating mechanism for the auxiliary friction clutch 50, or with means for varying the power output of the driving engine.

As an alternative arrangement, the auxiliary slipping clutch may be associated with an auxiliary gear train giving say 5% higher speed than the fourth gear train. In this case the balking means associated with the fourth gear train may be of the type which allows the gear to be engaged only upon a reversal of the relative rotation of the selecting toothed clutch members following the attainment of absolute synchronism. With this alternative arrangement, in order to facilitate changing down from any higher gear to any lower gear, the load on the toothed clutch associated with the higher gear may be relieved by momentarily engaging the auxiliary friction clutch with a relatively heavy pressure. Such an arrangement is shown in Fig. 8, which represents a gear mechanism similar to that shown in Fig. 1, with the exception that an auxiliary gear train 120, 121 is provided, having a ratio about 5% higher than the ratio of the fourth gear train 14, 24, the gear wheel 120 being fixed to the driving shaft 3' and the gear wheel 121 being mounted on the driven shaft 20' and normally free to rotate relative thereto. The gear-wheel 121 is secured to the body element of the auxiliary coupling 50', of which the disk element 62' is splined to the driven shaft 20'.

There may be provided, for the purpose of facilitating disengagement of a gear after the locomotive has come to rest, means for relieving the torque on the engaged teeth, such as are described in my Patent 1,978,472 granted Oct, 23, 1934.

The auxiliary coupling means need not be in the form of a friction clutch, for example, it may be a hydraulic piston or radial vane type clutch or a hydrokinetic coupling having a negligibly small slip when fully engaged, and it may be situated in any suitable part of the multi-ratio gear mechanism. The arrangement shown in Fig. 1, however, where the auxiliary coupling 50 is coaxial with the shaft 20 and disposed beyond the end of the shaft 3, is particularly convenient, since the diameter of the auxiliary coupling is not limited by adjacent parts of the gearing and a clutch of adequate capacity and of simple design can therefore be easily accommodated.

With a power-transmission system according to the present invention and comprising a hydraulic coupling, the transmission of torque may be maintained during gear changing, and therefore the system may be greatly simplified as compared with systems in which the transmission is interrupted. For example, there may be employed a hydraulic coupling in which no controlling means are provided for varying the slip at will, and even when such a simple coupling is used, it is unnecessary to provide a clutch stop on the driven shaft, nor is it required to provide a friction clutch in series with the power-transmission mechanism.

While it is preferred to provide a hydraulic coupling of the kinetic type between the driving engine and the multi-ratio gearing, any other suitable coupling may be substituted therefor, for example, a friction clutch which may be provided with automatic control means responsive, for instance, to the action of centrifugal force.

It is not essential to employ a multi-ratio gear mechanism provided with means, such as balking rings, for preventing engagement of gears unless the speeds of the parts to be engaged are substantially synchronized. For example, the invention may be applied to the power-transmission system of an automobile, comprising a hydraulic coupling and/or a friction clutch connected between the engine and a conventional type of countershaft gear box.

I claim:

1. A power-transmission system comprising a multi-ratio gear mechanism having a driving shaft and a driven shaft, a hydraulic coupling of the kinetic type for transmitting power to said driving shaft, auxiliary coupling means, having two elements adapted to be coupled to and uncoupled from each other, and capable of transmitting substantial driving torque at a variable velocity ratio from said hydraulic coupling to said driven shaft, and control means operable for coupling said two elements together, the said two elements being in mechanical connection with said driving and driven shafts respectively during all the operations of changing from a lower to a higher speed gear.

2. A power-transmission system comprising a multi-ratio gear mechanism having a driving shaft and a driven shaft, an auxiliary coupling capable of transmitting torque at a variable velocity ratio between said driving and driven shafts, means for pre-selecting a gear of said mechanism, means serving to engage said preselected gear automatically when the speed-ratio of said shafts attains substantially the ratio of said selected gear, and means responsive to said last-mentioned means for automatically disconnecting the drive through said auxiliary coupling.

3. A power-transmission system comprising a multi-ratio gear mechanism having a driving shaft and a driven shaft, an auxiliary coupling capable of transmitting torque at a variable velocity ratio between said driving and driven shafts so as to maintain power transmission while the ratio of said gearing is being changed, selecting means for engaging a gear of said gear mechanism, means for preventing engagement of said gear unless the speeds of said shafts are in substantially the ratio of said gear, and means responsive to said selecting means for automatically disconnecting the drive through said auxiliary coupling.

4. A multi-ratio change-speed gearing having an input shaft and an output shaft, and auxiliary coupling means having two elements adapted to be coupled to and uncoupled from each other and connected respectively to said input and output shafts, said auxiliary coupling means being capable of maintaining, while the ratio of said gearing is being changed, the transmission of substantial torque from said input shaft to said output shaft in a ratio giving a higher speed than is given by the highest speed gear of said gearing.

5. A power transmission system comprising a multi-ratio gear mechanism having a driving shaft and a driven shaft, an auxiliary slippable coupling having a driving element and a driven element connected for rotation with said driving and driven shafts respectively, control means for engaging said auxiliary coupling during gear changing so as to cause said auxiliary coupling to maintain the transmission of substantial power between said shafts while no gear of said gear mechanism is engaged, selecting means operable for engaging a gear of said gear mechanism, and means responsive to movement of said gear selecting means for automatically disengaging said auxiliary coupling.

6. In combination, a multi-ratio gear mechanism, an auxiliary coupling in parallel with said gear mechanism, means for disengaging said auxiliary coupling, a primary selector operable for preselecting a gear of said gear mechanism, a secondary selector which operates to engage said preselected gear, and means which are operatively connected with said coupling disengaging means and which function in response to relative movement of said primary and secondary selectors, whereby said auxiliary coupling is automatically disengaged as a result of engagement of said gear.

7. In combination, a multi-ratio gear mechanism, an auxiliary coupling in parallel with said gear mechanism, means for disengaging said auxiliary coupling, a plurality of cooperating pairs of primary and secondary gear change selectors, control means operable for preselecting a gear of said gear mechanism by urging the primary and secondary selectors of each of said pairs into a particular relationship, and means which are operatively connected with said coupling disengaging means and which function in response to relative movement of said primary and secondary selectors, whereby said auxiliary coupling is automatically disengaged as a result of said pairs of selectors attaining said particular relationship.

8. In combination, an engine, a multi-ratio change-speed gearing having an input shaft driven by said engine, and an output shaft, a friction clutch having a driving element and a driven element drivably connected with said shafts respectively in a ratio yielding, when said clutch is not slipping, a speed not lower than the highest speed gear of said gearing, and said clutch being of such capacity as to be capable of transmitting a torque corresponding to at least one-half of the maximum engine torque, and control means which serve, during the operation of changing from any lower to any higher speed gear, to maintain said friction clutch engaged and thus to maintain the transmission of torque from said engine to said output shaft during said gear-changing operations.

9. A power transmission system comprising a driving motor shaft, a multi-ratio gear mechanism having an input shaft coupled to said motor shaft and an output shaft, auxiliary coupling means having two elements adapted to be coupled to and uncoupled from each other, and control means operable for effecting the coupling together of the said two elements, said auxiliary coupling means being in parallel with said gear mechanism and capable of transmitting from said motor shaft to said output shaft a torque corresponding to at least half full-load torque in said motor shaft, and the said two elements being in mechanical connection with said input and output shafts respectively during all the operations of changing from a lower to a higher speed gear.

10. A power transmission system comprising a driving motor shaft, a multi-ratio gear mechanism having an input shaft coupled to said motor shaft and an output shaft, auxiliary coupling means having two elements adapted to be coupled to and uncoupled from each other, and control means operable for effecting the coupling together of the said two elements, the said auxiliary coupling means being in parallel with said gear mechanism and capable of transmitting from said motor shaft to said output shaft a torque corresponding to at least half full-load torque in said motor shaft, and the said two elements being mechanically connected in invariable ratio with said driving and driven shafts.

11. In a power transmission system, a multi-ratio gear mechanism comprising a driving shaft and a driven shaft, a friction clutch having a driving element and a driven element connected in invariable ratio with said shafts respectively and capable of transmitting a torque corresponding to at least one-half of the full-load torque of said driving shaft, and control means operable for engaging said friction clutch so as to maintain the transmission of substantial power through said system while a gear of said gear mechanism is being disengaged.

12. A power transmission system comprising an input shaft, a multi-ratio gear mechanism having a driving shaft, a driven shaft and means which serve to prevent engagement of a gear thereof unless the ratio of the speeds of said driving and driven shafts equals the ratio of said gear, a hydraulic coupling of the kinetic type having a driven element permanently connected to said driving shaft and constituting the sole means for transmitting power from said input shaft to said gear mechanism, a control member operable for preselecting said gear, elastic means which, while said gear mechanism is running, can be actuated by said control member and which thereafter serve automatically to engage said preselected gear without objectionable shock, auxiliary slippable coupling means in parallel with said gear mechanism and which are capable of connecting said driving and driven shafts in a ratio yielding a speed not lower than the highest speed gear of said gearing, and control means operable during gear changing for engaging said auxiliary coupling means.

13. A power transmission system comprising a multi-ratio gear mechanism having a driving shaft and a driven shaft, an auxiliary coupling having driving and driven parts operatively connected to said driving and driven shafts respectively, and capable of transmitting at a variable velocity ratio between said shafts, a torque corresponding to at least one-half of the normal maximum driving torque applied to said driving shaft, control means operable for preselecting a gear of said gear mechanism, control means operable for engaging said auxiliary coupling and causing it to vary the relative speeds of said shafts, and means which, while the gear mechanism is running and after the engagement of said auxiliary coupling, serve to engage said preselected gear without objectionable shock.

14. A power transmission system comprising an engine-driven shaft, a multi-ratio gear mechanism having an input shaft drivably connected to said engine-driven shaft, an output shaft, cooperating toothed elements connected to said input and output shafts respectively and capable of being engaged together to establish a gear of said gear mechanism, gear changing control means for urging said toothed elements into engagement, and balking means for preventing interengagement of said toothed elements while one of them is rotating substantially faster than the other, auxiliary slippable coupling means having a driving member and a driven member connected to said input and output shafts respectively and capable of transmitting at least one-half of the normal full-load power applied to the system, and control means operable during gear changing for engaging said auxiliary coupling means so as to maintain the transmission of substantial power from said engine-driven shaft to said output shaft while varying the relative speed of said toothed elements so as to permit of their engagement.

15. A power transmission system comprising an engine-driven shaft, a multi-ratio gear mechanism having an input shaft drivably connected to said engine-driven shaft, an output shaft, means including two relatively displaceable toothed elements drivably connected to said input and output shafts respectively and capable of being engaged together to establish a gear of said gear mechanism, gear changing control means operable for urging said toothed elements into engagement, and rotatably mounted on one of said elements a balking member adapted to engage the other of said elements, when the speeds of said elements are substantially different and thereby prevent interengagement of the teeth of said elements, auxiliary slippable coupling means having a driving member and a driven member connected to said input and output shafts respectively and capable of transmitting at least one-half of the normal full-load power applied to the system, and control means operable during gear changing for engaging said auxiliary coupling means so as to maintain the transmission of substantial power from said engine-driven shaft to said output shaft while varying the speed of said toothed elements so as to permit of their engagement.

16. A multi-ratio gear mechanism comprising an input shaft and an output shaft, a friction clutch having a driving element and a driven element drivably connected in invariable ratio with said shafts respectively, said friction clutch when not slipping, yielding a speed not lower than the highest speed gear of said gearing, and control means operable, during changing from any lower to any higher speed gear, for maintaining said friction clutch engaged, said friction clutch being of such capacity as to be capable of maintaining the transmission of a torque corresponding to at least one-half the full load torque in said input shaft, from said input shaft to said output shaft during gear changing.

17. A transmission gear mechanism providing a plurality of different ratios and comprising a clutch having cooperating toothed elements and which when engaged establishes the highest speed ratio of said gear mechanism, gear-selecting means operable for engaging said clutch, an auxiliary slippable coupling having a driving part and a driven part connected for rotation with said toothed elements respectively, control means operable during gear changing for engaging said auxiliary coupling, and a balking member rotatably mounted on one of said toothed elements for preventing engagement of said clutch when relative rotation of said toothed elements occurs in one direction, teeth of said elements being bevelled to prevent engagement of said clutch when substantial relative rotation of said toothed elements occurs in the other direction.

HAROLD SINCLAIR.